(No Model.) 2 Sheets—Sheet 1.

T. C. ST. JOHN.
CORN HARVESTER.

No. 447,624. Patented Mar. 3, 1891.

WITNESSES: Chas. Nida, C. Sedgwick

INVENTOR: T. C. St. John
BY Munn & Co.
ATTORNEYS (No Model.) 2 Sheets—Sheet 2.

T. C. ST. JOHN.
CORN HARVESTER.

No. 447,624. Patented Mar. 3, 1891.

WITNESSES:
Chas. Nida
C. Sedgwick

INVENTOR:
T. C. St John
BY
Munn & Co
ATTORNEYS

UNITED STATES PATENT OFFICE.

THOMAS C. ST. JOHN, OF WILLOUGHBY, OHIO.

CORN-HARVESTER.

SPECIFICATION forming part of Letters Patent No. 447,624, dated March 3, 1891.

Application filed February 26, 1890. Serial No. 341,807. (No model.)

*To all whom it may concern:*

Be it known that I, THOMAS C. ST. JOHN, of Willoughby, in the county of Lake and State of Ohio, have invented a new and Improved Corn-Harvester, of which the following is a full, clear, and exact description.

The object of the invention is to provide a new and improved corn-harvester which is simple and durable in construction, very effective in operation, and adapted to be conveniently moved over the field to cut the ears from the stalks, and to gather the same in the wagon supporting the machine.

The invention consists of certain parts and details and combinations of the same, as will be hereinafter fully described, and then pointed out in the claims.

Reference is to be had to the accompanying drawings, forming a part of this specification, in which similar letters of reference indicate corresponding parts in all the figures.

Figure 1:
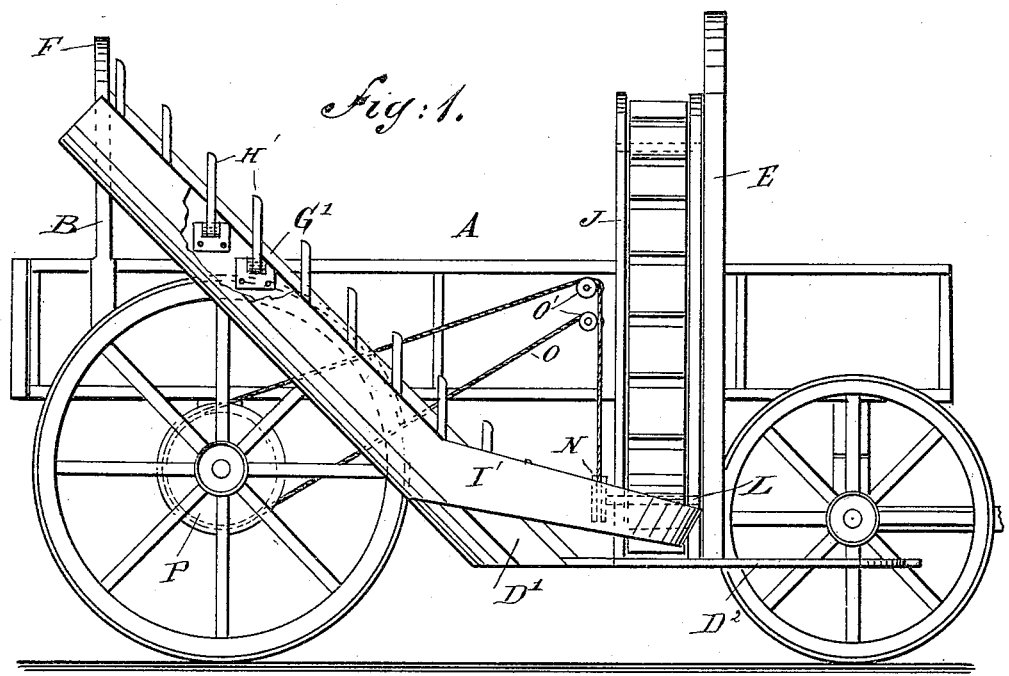
Figure 2:
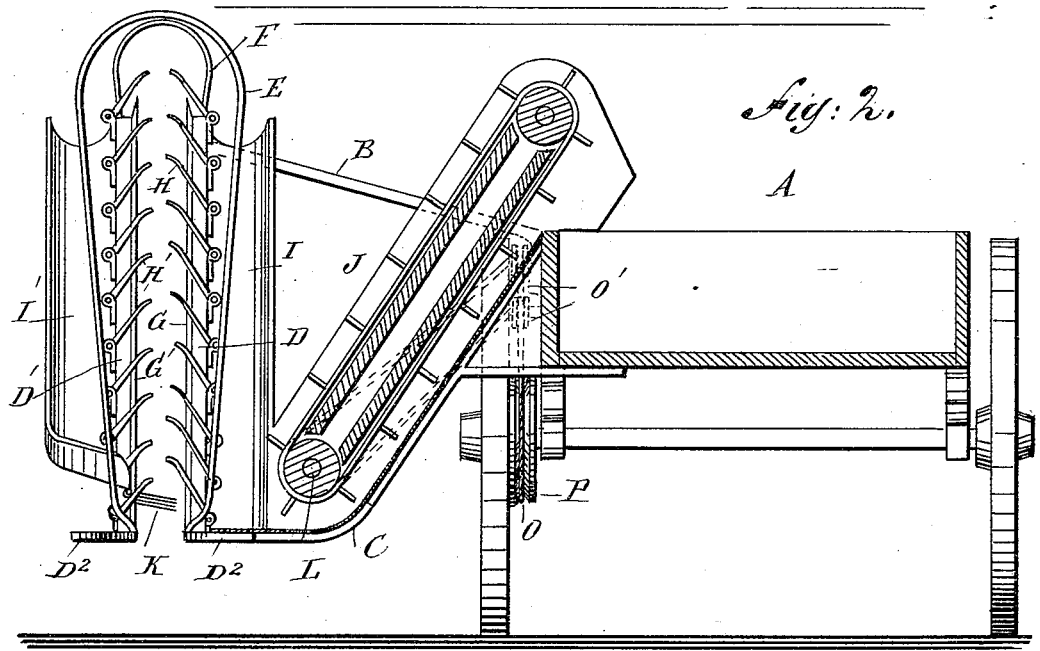
Figure 3:
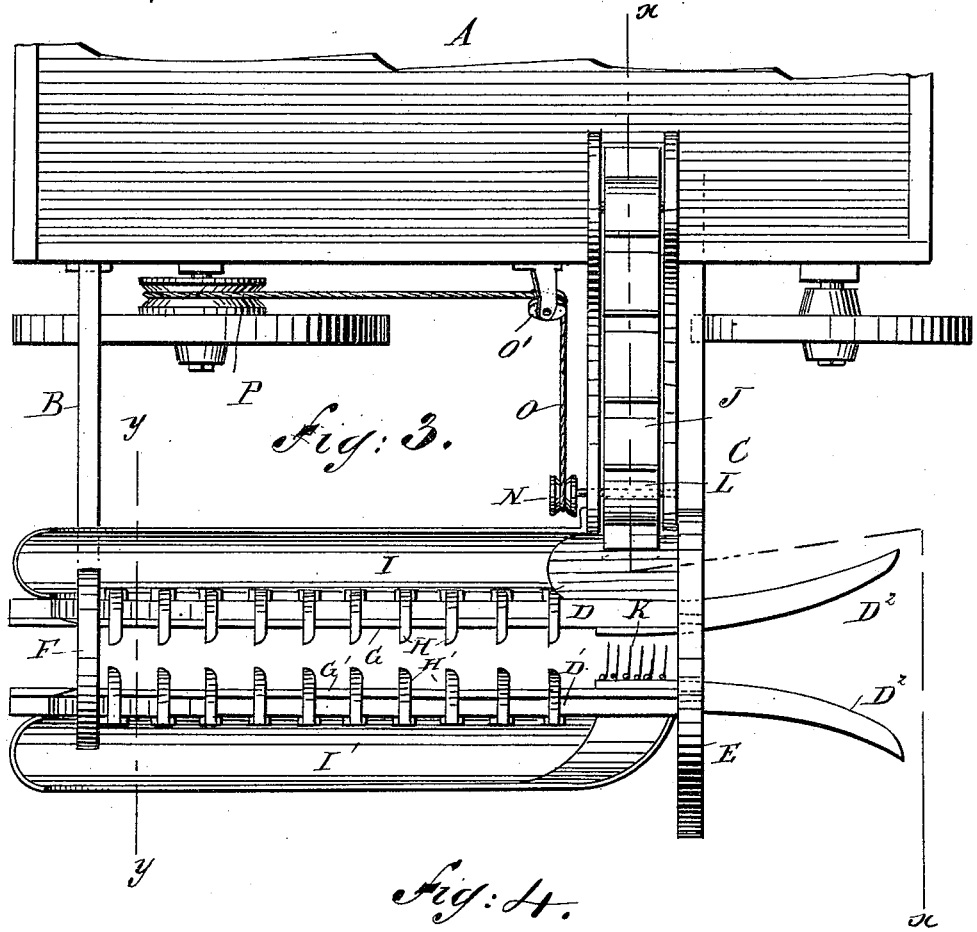
Figure 4:
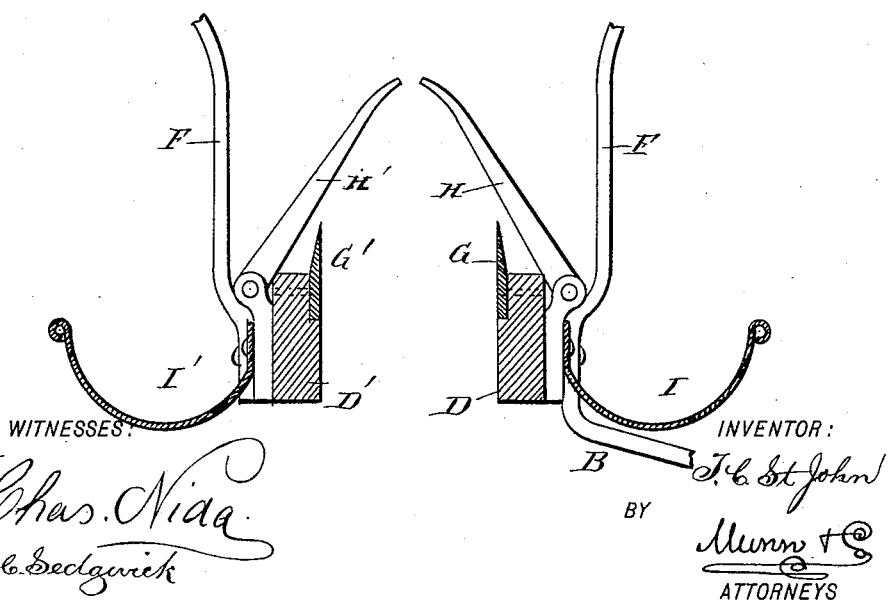

Figure 1 is a side elevation of the improvement. Fig. 2 is a transverse section of the same on the line $xx$ of Fig. 3. Fig. 3 is a plan view of the same, and Fig. 4 is a transverse section of the cutting mechanism on the line $yy$ of Fig. 3.

The improved corn-harvester is mounted on an ordinary farm-wagon A of any approved construction, and which can be readily drawn over the field for cutting the ears from the stalk by means of the machine attached to the wagon. The bed of the wagon A is provided with two transversely-extending brackets B and C, supporting near their outer ends an inclined beam D, having its front horizontally-extending end $D^2$ curved outward, as plainly shown in Fig. 3. A second beam D' is placed parallel and in line with the beam D, and is rigidly attached to the same by a U-shaped curved bar E extending vertically, and by a similarly-shaped bar F, attached to the upper ends of the beams D and D', while the bar E is attached to the lower ends, as plainly shown in the drawings. The tops of the bars E and F are sufficiently high above the ground to permit the stalks to pass freely under the tops of the said bars E and F. (See Fig. 1.)

The beams D and D' are each provided on the inside with upwardly-projecting knife-blades G and G', extending the length of the inclined part of said beams and serving to sever the ear from the stalk, as hereinafter more fully described. The knives G and G' are inclined similarly to the beams D and D', so that the ears of corn hanging low on the stalks as well as those hanging high on the stalks can be readily cut.

On the outside of the beams D and D' are arranged upwardly and inwardly extending fingers H and H', pivoted to the said beams, so as to swing or spring outward to accommodate stalks of different thicknesses as they pass between the beams D and D' and the sets of fingers H and H', respectively.

On the outside of the beams D and D' are arranged curved chutes I and I', respectively, about semicircular in shape, as plainly shown in Fig. 4, the lower end of the chute I discharging onto an elevator J of any approved construction, and supported from the wagon-bed and discharging into the same, as plainly illustrated in the drawings. The lower end of the chute I' discharges onto a series of transversely-extending spring-fingers K, which lead into the lower end of the chute I, so that the ears of corn passing down the said chute I' are transmitted across the beams D and D' into the lower end of the chute I to be taken up by the elevator J into the bed of the wagon A.

The shaft of the lower pulley L of the elevator J is provided with a grooved pulley N, over which passes an endless belt O, also passing over idlers O', held on the wagon-bed, and also passing over a grooved pulley P, secured to the face of one wheel of the wagon A. Thus when the wagon A is drawn forward over the ground the wagon-wheel in turning causes the pulley P to move with it and impart a traveling motion to the belt or cord O, which in passing over the pulley N actuates the elevator J.

The operation is as follows: The wagon A is drawn over the field in such a manner that the cornstalks pass into the outwardly-curved horizontally-extending ends $D^2$ of the beams D and D'. The salks on the further motion of the wagon A come in contact with the pivoted fingers H and H' until an ear of corn, at whatever height it may hang on the stalk, comes in contact with one or more of the fingers H or H', and then by the natural resistance of the roots of the stalks the ear is drawn down the respective fingers and on the outside of the fingers, thus causing the stem of the ear to be drawn into the slot between two successive fingers and down either side of the main slot onto the cutting-edge of the respective knife G or G', which latter cuts the ear off at its butt-end, the stalk passing freely between the remaining fingers and on out of the open slot between the parallel beams D and D', and also under the bar F, without breaking or injuring the stalk, while the cut ear slides down the respective chute I or I' to be taken up by the elevator J and deposited in the bed of the wagon A.

It is understood that as the beams D and D' are upwardly and rearwardly inclined the ears, no matter at what height they hang on the stalk, come in contact with one of the sets of fingers H or H' to be guided by the latter onto the knife G or G', respectively, the root of the stalk being held firmly in the ground.

Having thus described my invention, I claim as new and desire to secure by Letters Patent—

1. A corn-harvester having two parallel inclined beams adapted to straddle a row of corn and forming a free and unobstructed passage between the same, in combination with a series of fingers pivoted to each of the beams and extending upward and inward toward the middle of the said passage, the said fingers being adapted to swing upward and outward only from their normal position, substantially as shown and described.

2. A corn-harvester having fingers pivotally connected at one end and adapted to swing at their free ends upward and outward only from their normal position over the passage through which pass the cornstalks, substantially as shown and described.

3. A corn-harvester having two parallel inclined beams adapted to straddle a row of corn and forming a free and unobstructed passage between the same, in combination with a series of fingers pivoted to each of the beams extending upward and inward toward the middle of the said passage and adapted to swing upward and outward only from their normal position, and knife-blades secured to the inside of the said beams and having their cutting-edges extending upward under the said fingers, substantially as described.

4. In a corn-harvester, two parallel inclined beams adapted to straddle the row of corn, chutes held on the outside of the said beams for transporting the cut ears to a common point of delivery, and flexible fingers extending from the lower end of one of the beams to the other to connect the lower ends of the chutes, substantially as shown and described.

5. In a corn-harvester, the combination, with upwardly and rearwardly inclined beams carrying knife-blades, of pivoted fingers held on the said beams and extending upward and toward each other, and chutes connected with the outsides of the said beams to receive the ear of corn after it is cut by the said knives, substantially as shown and described.

6. In a corn-harvester, the combination, with upwardly and rearwardly inclined beams carrying knife-blades, of pivoted fingers held on the said beams and extending upward and toward each other, chutes connected with the outsides of the said beams to receive the ear of corn after it is cut by the said knives, and an elevator connected with the lower ends of the said chutes to elevate the ears of corn sliding down the chutes, substantially as shown and described.

7. In a corn-harvester, the combination, with a wagon, of beams extending rearward and upward and supported from the said wagon, curved U-shaped bars connecting the said beams with each other, knives held on the inside edges of the said beams, and pivoted fingers held on the said beams and extending upward and toward each other, substantially as shown and described.

8. In a corn-harvester, the combination, with a wagon, of beams extending rearward and upward and supported from the said wagon, curved U-shaped bars connecting the said beams with each other, knives held on the inside edges of the said beams, pivoted fingers held on the said beams and extending upward and toward each other, chutes arranged on the outsides of the said beams and adapted to receive the ear of corn cut by the said knives, and flexible fingers held at the lower end of one of the beams at the end of one of the chutes to connect the lower ends of the chutes to each other, substantially as shown and described.

9. In a corn-harvester, the combination, with a wagon, of beams extending rearward and upward and supported from the said wagon, curved U-shaped bars connecting the said beams with each other, knives held on the inside edges of the said beams, pivoted fingers held on the said beams and extending upward and toward each other, chutes arranged on the outside of the said beams and adapted to receive the ear of corn cut by the said knives, flexible fingers held at the lower end of one of the beams at the end of one of the chutes to connect the lower ends of the chutes to each other, and an elevator connected with the lower end of one of the said chutes and adapted to discharge into said wagon, which is also adapted to impart motion to the said elevator, substantially as shown and described.

THOMAS C. ST. JOHN.

Witnesses:
  THEO. G. HOSTER,
  C. SEDGWICK.